Feb. 27, 1968     D. B. HARNEY     3,370,542

TEMPERATURE DETECTION DEVICE

Filed Oct. 21, 1965     2 Sheets-Sheet 1

INVENTOR.
DORAN B. HARNEY
BY Fulwider, Patton, Rieber,
Lee, and Utecht

ATTORNEYS

Feb. 27, 1968  D. B. HARNEY  3,370,542
TEMPERATURE DETECTION DEVICE
Filed Oct. 21, 1965  2 Sheets-Sheet 2

INVENTOR.
DORAN B. HARNEY
BY Fulwider, Patton, Rieber,
Lee, and Utecht
ATTORNEYS United States Patent Office 3,370,542
Patented Feb. 27, 1968

3,370,542
TEMPERATURE DETECTION DEVICE
Doran B. Harney, Downey, Calif., assignor to Dresser Industries, Inc., Dallas, Tex., a corporation of Delaware
Filed Oct. 21, 1965, Ser. No. 499,913
14 Claims. (Cl. 103—97)

ABSTRACT OF THE DISCLOSURE

Apparatus for sensing the temperature difference between the inlet fluid and discharge fluid of a multistage centrifugal pump which includes a balancing piston (86) fixed to the impeller shaft adjacent to the discharge end. The piston is surrounded by a pressure reducing sleeve (82) defining, with the piston, an annular clearance space (89) through which leakage fluid flows from the discharge of the pump to a leakage collection chamber (94) which is maintained at a much reduced pressure. Passage means are provided for directing some of the fluid flowing through the annular leakage space into a sensor chamber, and from the sensor chamber to the leakage collection chamber (94). The sensing element of a temperature-sensing device is disposed within the sensor chamber (132) for measuring the temperature of the fluid flowing through the leakage space and before it is contaminated by any injection liquid which might flow into the leakage collection chamber (94). A second temperature-sensing device measures the temperature of the inlet fluid; and the inputs from the two temperature-sensing devices are fed to a control device such as a differential relay mechanism. The control device functions to open a valve in an auxiliary discharge outlet from the pump, to assure fluid flow through the pump when the temperature difference between the inlet and outlet exceeds a certain preselected value.

This invention relates to centrifugal and reaction types of pumps, and more particularly to fluid temperature rise measurement and temperature actuated protective means for such pumps.

In non-positive displacement pumps, and particularly in multistage, high pressure centrifugal pumps, it is necessary to protect the pump from over-heating due to the continued drive of the pump and the resultant input of energy into the liquid within the pump when the discharge is shut off and the flow through the pump is thereby stopped. In large, multistage, high pressure centrifugal pumps, such as are used, for example, in petroleum, chemical, boiler feed and the like services, a pump may contain several gallons of such liquid within the pump stator and impeller passages and such liquid can absorb energy at the rate of several thousand horsepower, when the flow therethrough is substantially reduced or stopped. Under such conditions, the temperature within the pump can rise several hundred degrees within a few seconds, causing damage or even destruction of the pump by the resultant pressure of vaporization of the liquid therein and the interference between close fitting parts caused by differential expansion and distortion thereof.

Since the temperature rise following such shutoff of the pump can be extremely rapid, any temperature rise detection means, or any protective device dependent upon detection of such temperature rise, must be capable of sensing such temperature at a significant point, preferably at or closely adjacent the point of maximum temperature rise in the pump assembly, and respond sufficiently rapidly to actuate any mechanism capable of removing the condition causing such temperature rise, before damage can occur.

Heretofore, various protective means have been attempted to be employed. In one such arrangement a temperature sensing device, such as a thermocouple, has been placed in the discharge passage of the pump. This has proven to be unsatisfactory because upon closing the discharge valve the flow of liquid from the pump past the temperature sensing device stops, thereby preventing or at least greatly delaying the transmission of heat from the critical portions of the pump to the temperaure sensing devices.

Temperature sensing devices have also been placed in the leak-off portions or lines leading from balanced fluid injection shaft packing devices where such packing devices are employed, but this has proven unsatisfactory and unreliable because the injection liquid employed is usually cooler or at least of different temperature than the pump discharge liquid, and since it commingles with the pump discharge leakage liquid, a significant and reliable determination of the pump interval liquid temperature cannot thus be made.

It is accordingly an object of this invention to provide a temperature rise detection device capable of detecting temperature conditions at a point of optimum significance in a centrifugal pump assembly.

It is another object of this invention to provide a temperature detection means capable of detecting a temperature rise in the fluid within a centrifugal pump assembly with a minimum of time delay.

It is still another object of this invention to provide a temperature sensing device for detection and following of the temperature rise of fluid in a centrifugal pump assembly, having improved reliability.

It is a still further object of this invention to provide means for automatically protecting the centrifugal pump assembly from the occurrence of a destructive temperature rise of the fluid therein upon stoppage or substantial throttling of the flow of fluid through the pump.

These and other objects, advantages and features of novelty of this invention will be evident hereinafter.

In the drawings which show by way of illustration a presently preferred embodiment of the invention, and in which like reference characters designate the same or similar parts throughout the several views.

Apparatus

Figure 1:
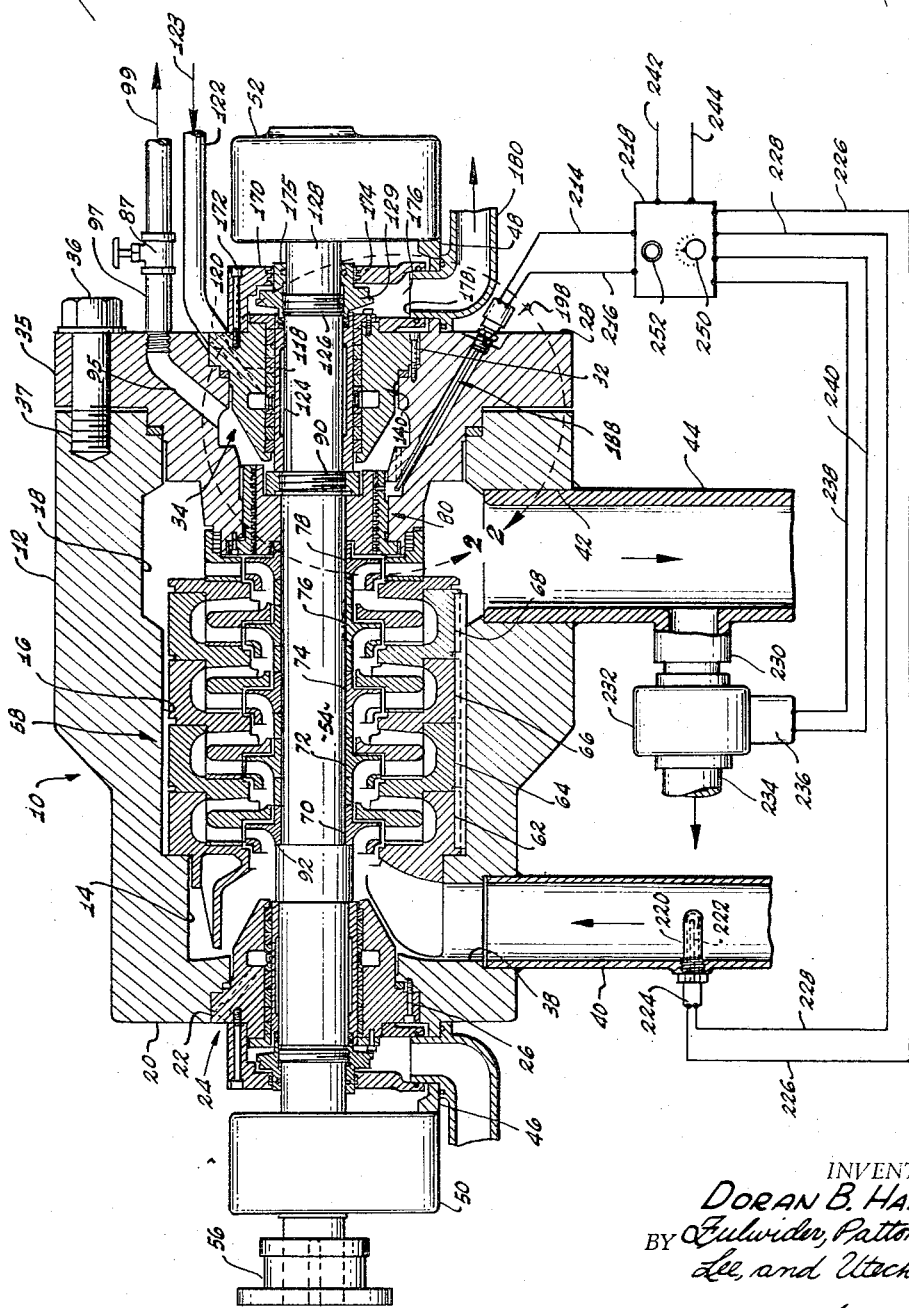
FIGURE 1 is a longitudinal, sectional elevation of a typical multistage centrifugal pump assembly, showing an installation of the apparatus of the invention in connection therewith, partly in elevation and partly schematically.

Referring first primarily to FIGURE 1 which illustrates, by way of example but not by way of limitation, a typical environment for the apparatus of the invention, a multistage high pressure centrifugal pump assembly is shown generally at 10 having a hollow cylindrical housing 12 formed with a coaxial bore having an inside diameter which varies increasingly stepwise axially from the inlet end to the outlet end, such bore having an inlet bore section 14 of minimum inside diameter, an intermediate pump containing bore section 16 of intermediate inside diameter, and a discharge bore section 18 of maximum inside diameter.

The left hand end of the inlet bore section 14, as viewed in FIGURE 1, is closed by an integrally formed inlet end head 20 having formed therein a coaxial drive shaft packing assembly bore 22 containing therein a seal ring assembly housing shown generally at 24. The seal ring assembly housing 24 is held in place in the packing assembly bore 22 by a plurality of circumferentially spaced-apart bolts, one of which is in view at 26. The bore of the pump housing is closed at the right hand end of the discharge bore section 18 by a removable discharge end head 28 which is formed with a peripheral flange 35 and a coaxial packing assembly bore 32 therethrough. Coaxially supported in the bore 32 is a seal ring assembly housing shown generally at 34 which, by way of convenience, is here shown identical to the hereinbefore mentioned seal ring housing 24. The discharge end head 28 is bolted to the right hand or discharge end of the pump housing 12 by means of a plurality of head bolts, one of which is in view at 36, and which extend through circumferentially spaced-apart bolt holes in the flange 35 and into correspondingly positioned threaded bolt holes in the end of the housing as shown at 37.

The pump housing 12 is provided with an inlet port 38 extending from the exterior thereof into the inlet bore section 14, and to the outer end of which may be attached a suitable inlet or suction pipe 40. The pump housing 12 is also provided with a discharge port 42 leading from the discharge bore section 18, to the exterior of the housing 12, and to the outer end of which may be attached a suitable pump discharge pipe 44.

Supported externally of the inlet end head 20 and the discharge end head 28 by suitable bracket means 46 and 48 respectively, are pump drive shaft outboard bearings 50 and 52 respectively. Extending coaxially through the pump drive shaft outboard bearings 50 and 52, the seal ring assembly housings 24 and 34 and through the pump housing bore sections 14, 16 and 18 is a pump drive shaft 54. The left hand end of the pump drive shaft 54, as viewed in FIGURE 1, extends outwardly through the pump drive shaft outboard bearing 50 and has fixed on the outer end thereof a flange coupling member 56 for connection to the shaft of a pump-drive prime mover, not shown.

Contained coaxially within the pump housing 12 and positioned mainly coaxially within the intermediate pump-containing bore section 16 thereof, is a multistage centrifugal pump assembly shown generally at 58. The centrifugal pump assembly 58 which, for the purposes of this invention, may be of substantially conventional design and therefore is not described in complete detail herein, comprises a plurality of coaxial, series-connected pump stages comprising outer pump covers or stators 60, 62, 64, 66 and 68 coaxially supported and non-rotatably keyed and clamped within the intermediate pump-containing bore section 16, and a corresponding number of centrifugal pump inpellers 70, 72, 74, 76 and 78 therein, fixed to the intermediate portion of the pump drive shaft 54 for rotation therewith. The first or low pressure stage comprising the first stator 60 and first impeller 70, of the centrifugal pump assembly 58, is in communication with and, when in operation, receives fluid from the inlet bore section 14 of the pump housing 12 into which the inlet pipe 40 and the inlet port 38 extend, and the last or high pressure stage comprising the last stator 68 and last impeller 78 of the centrifugal pump element assembly 58 is in communication with and when in operaion, discharges fluid therefrom into the discharge bore section 18 of the pump housing 12 from which the discharge port 42 and discharge pipe 44 extend.

Figure 2:
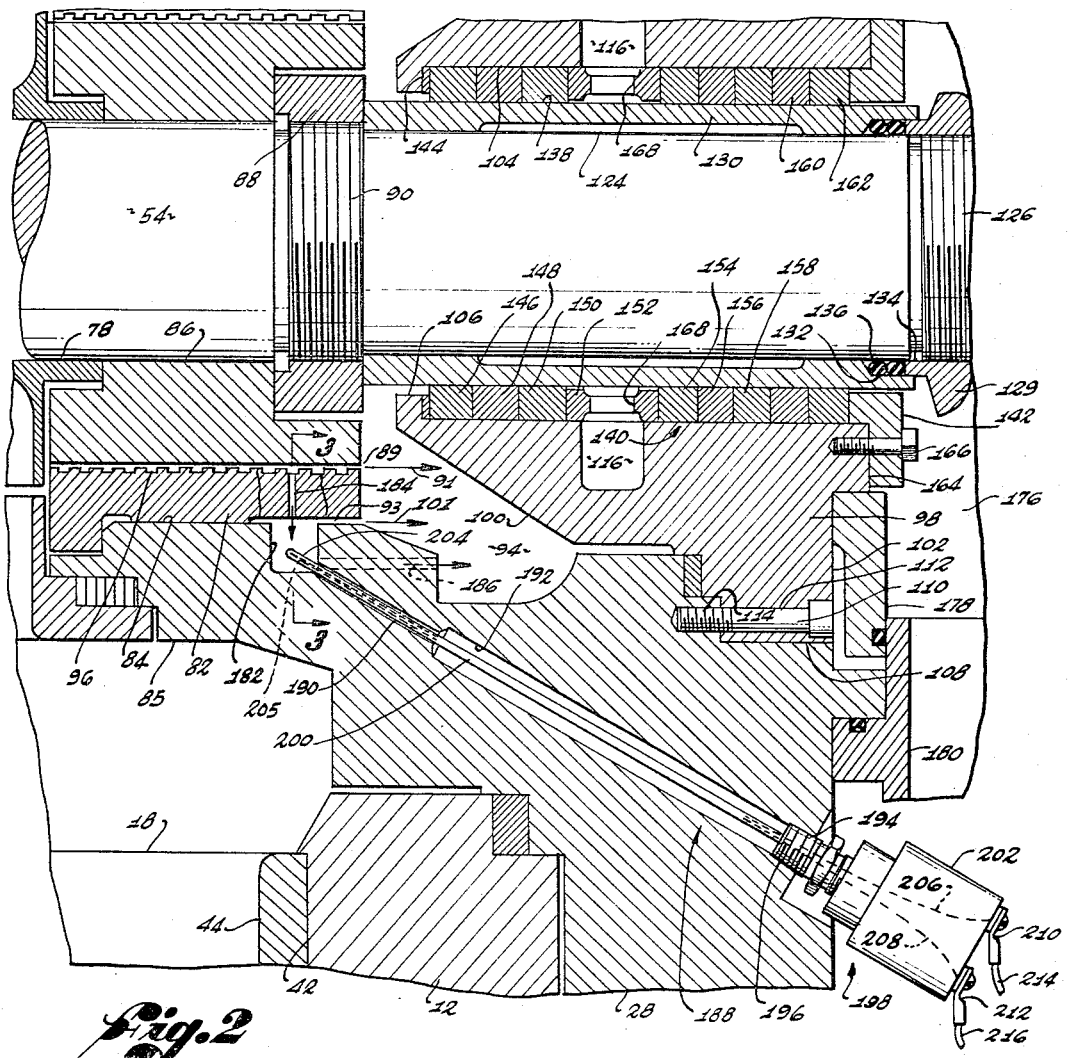
FIGURE 2 is an enlarged, detailed, fragmentary view of the portion of FIGURE 1 shown approximately enclosed within the arrowed, broken lined, enclosure 2—2.

Referring next mainly to FIGURE 2, the centrifugal pump assembly is provided with a leakage pressure reducing and axial shaft force balancing means assembly shown generally at 80, which comprises an external pressure reducing bushing 82 and an internal, concentrically, rotatably positioned cylindrical balancing piston member 86. The pressure reducing sleeve 82 is fixed coaxially of the shaft 54 in a bore 84 formed in an axially inboard-extending portion 85 of the discharge end head 28, and the cylindrical balancing piston member 86 is fixed on the drive shaft 54 by means of an annular retainer nut 88 threaded onto a shouldered section of the shaft 54, as shown at 90. The annular retainer nut 88 serves not only to lock the cylindrical balancing piston 86 on the shaft 54, but also to clamp the plurality of end-to-end positioned impellers 70, 72, 74, 76, and 78 together against annular shoulder 92 formed on the shaft 54 adjacent the inlet section 14 of the pump assembly.

The outside diameter of the balancing piston member 86 and the inside diameter of the pressure reducing sleeve 82 are such as to provide a narrow, annular clearance space 89 therebetween which permits free axial movement and rotation of the balancing piston 86 relative to the pressure reducing sleeve 82 and provides a leakage path therebetween for controlled escape of fluid, as indicated by arrow 91, from the high pressure discharge bore section 18 of the housing 12 to a reduced pressure leakage collection chamber 94 formed within an inner porion of the discharge end head 28 intermediate the seal ring assembly housing 34 and the aforesaid pressure reducing and axial force balancing means assembly 80. The leakage collection chamber 94 is provided with an outlet passage 95 extending through the discharge end head 28, to which is connected a drain pipe 97. The bore of the pressure reducing bushing 82 is preferably formed with a plurality of annular, axially spaced-apart grooves 96 which serve, in operation, to increase the resistance to flow and assist in control of the quantity of liquid thus escaping through the clearance space 89 to the collection chamber 94.

Referring again in more detail to the seal ring, assembly housing shown generally at 34, such seal ring assembly housing is formed of a generally cylindrical body 98, tapered inwardly at its inboard end as shown at 100, and having a radially flanged portion 102 at its outboard end, and a coaxial bore 104 extending therethrough which is of uniform inside diameter except for a radially inwardly extending, annular retainer flange 106 formed at the inboard end thereof. The seal ring assembly housing 34 is bolted to the discharge end bore head 28, with the radially flanged portion 102 thereof seated in an annular recess 108 coaxially formed in the outer face of the discharge end head 28, by means of a plurality of circumferentially spaced-apart stud bolts 110 which extend through bolt holes in the radial flange portion 102 and into threaded engagement with correspondingly positioned threaded sockets in the seal ring assembly housing 34, one such stud bolt, bolt hole and threaded socket being best shown respectively at 110, 112, and 114 in FIGURE 2.

The cylindrical body portion 98 of the seal ring assembly housing 34 is provided, at an intermediate section thereof, with an internal, coaxially positioned, circumferentially extending annular cavity 116 communicating around its inner side with an intermediate portion of the beforementioned bore 104. The annular cavity 116 is connected through a lateral duct shown in broken lines 118 in FIGURE 1, with an injection inlet port 120 also shown in broken lines, to which may be connected a suitable injection inlet pipe 122 for injection of sealing control fluid under pressure to the seal ring assembly as and for the purpose hereinafter more fully described.

The portion of the pump drive shaft 54 extending immediately outboard of the annular retainer nut 88 and threaded interval 90 thereof, and extending coaxially through the bore 104 of the cylindrical body 98 of the seal ring assembly housing 34, is formed with a reduced outside-diameter section 124 having formed, in turn, at its outboard end a threaded interval 126, and beyond that a still further outboard shaft section 128 of still further reduced outside diameter which extends into and is supported by the hereinbefore mentioned pump shaft outboard bearing 52. Coaxially retained upon and surrounding the reduced outside-diameter section 124 of the shaft 54 between the annular retainer nut 88 and sleeve packing compression nut 129 threaded on threaded interval 126, is a removable shaft seal sleeve 130. The outboard end of the shaft seal sleeve 130 is provided with a short, counterbore 132 into which an axially extending, annular packing drive projection portion 134 of the compression nut 129 extends, for compressing an annular packing body 136 therein, into sealing engagement between the shaft seal sleeve 130 and the adjacent portion of the reduced outside diameter section 124 of the pump shaft 54.

The shaft seal sleeve 130 is formed with a smooth, cylindrical exterior surface 138 of uniform outside diameter throughout the length thereof, and contained coaxially within the annular space formed between the exterior surface 138 of the shaft seal sleeve 130 and the coaxial bore 104 of the cylindrical body 98 is a seal ring assembly shown generally at 140. The seal ring assembly 140, further suitable details of construction of which may be obtained by reference to copending application Ser. No. 450,937 filed Apr. 26. 1965, comprises in general a plurality of annular seal components which are clamped in end-to-end fluid tight arrangement with one another in the bore 104 of the cylindrical body 98 of the seal ring assembly housing 34, between the hereinbefore-mentioned annular retainer flange 106 and an annular retainer gland 142. Such components, taken in successive order from the inboard end thereof abutting the said retainer flange 104 to the outboard end thereof abutting the retainer gland 142 are seal ring gasket 144 inboard seal rings 146, 148 and 150, intermediate, annular spacer-ring 152 and outboard seal rings 154, 156, 158, 160 and 162.

The retainer gland 142 is bolted to the outer end of a cylindrical, projecting portion 164 of the cylindrical body 98 of the seal ring assembly housing 34 by a plurality of circumferentially spaced-apart cap screws as shown at 166. The hereinbefore-mentioned annular spacer ring 152, which is generally H-shaped in radial section, is clamped intermediate seal rings 150 and 154 in a position concentric with the beforementioned annular cavity 116, and is provided with a plurality of circumferentially spaced-apart, radially-directed apertures as shown at 168 which provide communication between the adjacent exterior surface of the shaft seal sleeve 130 and the aforesaid annular cavity 116. The injection inlet port 120 is thus placed in communication, by way of the lateral duct 118, and apertures 168 with the intermediate space in the bore 104 between the inboard group of seal rings 146, 148, 150 and the outboard group and seal rings 154, 156, 158, 160 and 162.

Clamped coaxially to the outboard end surface of the cylindrical body 98 of the seal rings assembly housing 34, and surrounding the pump drive shaft 54, is a generally annular shaped leakage collection housing 170. The leakage collection housing 170 is bolted to the outer face of the cylindrical body 98 of the seal ring assembly housing 34 by means of a plurality of circumferentially spaced-apart cap screws, one of which is in view at 172 in FIGURE 1. The leakage collection housing 170 is provided at the outboard end thereof with a leakage housing seal 174 which makes relatively close fit around the adjacent exterior surface of an outboard section 175 of the sleeve packing compression nut 129. The lower side of the leakage collection housing 170 is formed with a leakage collection sump 176 having a drain port 178 in the bottom thereof, to which may be connected a suitable drain pipe as shown at 180.

Formed into the lower side of the bore 84 of the inboard-extending portion 85 of the discharge end head 28, at an axially intermediate location, is a relatively small, arcuate recess 182; and interconnecting the arcuate recess 182 and the adjacent portion of the annular clearance space 89, between the pressure reducing bushing 82 and the cylindrical balancing piston 86, is a relatively small-diametered, radially directed fluid inlet duct 184. Also interconnecting the recess 182 with the leakage collection chamber 94 is a relatively small axially directed fluid outlet duct 186 and a narrow relief clearance space 93 between the outboard end portion of the bore 84 and the outside surface of the outboard end portion of the pressure reducing bushings 82. It will be noted, from FIGURE 3, that the fluid inlet duct 184 enters the recess 182 adjacent one circumferentially directed end thereof, and the fluid outlet duct 186 extends from a point adjacent the opposite, circumferentially directed end thereof.

Figure 3:
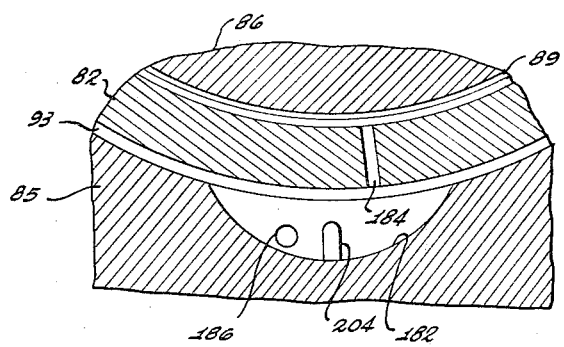
FIGURE 3 is a fragmentary, cross-sectional view taken on line 3—3 of FIGURE 2.

Drilled obliquely through the body of the discharge end head 28 and extending from a point on the outer face thereof into the recess 182 is a temperature sensor well 188. The well 188 is formed with an innermost portion 190 of reduced inside diameter and an outer portion 192 of increased inside diameter, the latter being internally threaded at its outer end, as shown at 194, for reception of the threaded shank 196 of a temperature sensor assembly shown generally at 198. The temperature sensor assembly 198 comprises an elongated, fluid-tight tubular element 200 which extends from an external terminal head 202 through the threaded shank 196 and therefrom through the temperature sensor well bore 188 to a position at which its inner end portion 204 occupies a position in the recess 182, as best shown in FIGURE 3, intermediate the beforementioned fluid inlet duct 184 and fluid outlet duct 186. The inner end portion 204 of the tubular element 200 contains a suitable temperature responsive element 205 such as, for example, a conventional thermocouple. The temperature responsive element 205 is connected through suitable electrical conductors 206 and 208, which extend through the tubular element 200 into the terminal head 202, to a pair of insulated lead-in terminals 210 and 212 which, in turn, are connected with external conductors 214 and 216. The external conductors 214, 216 are electrically connected to control apparatus, not shown, contained in a control box 218.

Threaded through the wall of the pump inlet pipe 40 and extending into the flow path of fluid entering the pump therethrough, is a well member 220 containing a temperature responsive element 222 which may be of a kind which is the same or similar to that of the herein beforementioned temperature responsive element 205, and which makes electrical connection through a threaded terminal head 224 to a pair of external conductors 226 and 228 which also lead to the herein beforementioned control apparatus contained with control box 218.

The pump discharge pipe 44 is provided, preferably closely adjacent to the pump discharge port 42, with a side outlet connection 230 to which is connected outlet valve 232 from which, in turn, extends an outlet pipe 234. The outlet pipe 234 may extend to suitable fluid disposal means as hereinafter more fully described in connection with the operation of the apparatus. The outlet valve 232 is provided with electrically actuated control means 236 for rapidly opening and closing the valve 232 in response to electrical signals conducted to it through conductors 238 and 240 from the electrical control apparatus contained within the beforementioned control box 218. The control apparatus in control box 218, which may be a conventional differential relay mechanism, is supplied with the required electrical power for its operation and the operation of control means 236 through a pair of supply conductors 242 and 244.

*Operation*

The operation of the apparatus is as follows:

Assuming as a convenient, typical example, and not by way of limitation, that the apparatus of this invention is being employed in connection with a high pressure steam boiler feed system, water may be drawn from a boiler feed sump, at a temperature ranging from approximately 120° to 330° F. and at corresponding pressures, through the inlet or suction pipe 40 into the inlet bore section 14 of the housing 12 of the centrifugal pump 10 and thence pass through the centrifugal pump assembly 58, from which it is delivered into the discharge bore section 18 of the pump housing 12 at an increased pressure which may be as high as approximately 4,000 p.s.i. and at a temperature ranging from approximately 20° F. to 75° F. higher than the inlet temperature, and thence be discharged through the discharge pipe 44 leading suitable connections into the boiler. Such temperature rise between the pump inlet and the pump discharge is approximately normal for such a pump of the kind hereindescribed, for normal operating conditions where a substantially continuous, uninterrupted flow of water is maintained through the pump to the boiler. However, in event, for any reason, the flow of water through the pump is substantially throttled or entirely cut off, then as hereinbefore mentioned, the temperature of the water entrapped in the relatively rotating stator and impeller portions of the pump may rise several hundred degrees within a few seconds.

Under all such temperature and pressure conditions, leakage or escape of water occurs, as indicated by arrow 91, continuously, at a relatively low rate through the annular clearance space 89 between the balancing piston 86 and the pressure reducing sleeve 82, from the high pressure discharge bore section 18 of the pump, into the relatively low pressure leakage collection chamber 94 from which it is discharged to a suitable disposal means through the discharge passage 95 and discharge pipe 97 as indicated by arrow 99. In the absence of suitable control means, such leakage flow would be relatively great, and if the pressure in the leakage collection chamber 94 were maintained too low, the leakage liquid entering thereinto would flash into vapor. To prevent occurrence of the latter, the discharge through pipe 97 is throttled sufficiently, by valve means 87, to maintain a substantial back pressure in the leakage collection chamber 94. Under the latter condition, and in the absence of means to prevent it, leakage would then tend to occur past the outboard drive shaft seal rings 154, 156 and 158 from the leakage collection chamber 94 into the annular cavity 116 in the sealing ring assembly body 98, and in the absence of the annular cavity 116 or in case a relatively high pressure is maintained therein, further leakage would tend to occur outward past the outboard seal rings 154, 156, 158, 160 and 162 into the leakage collection housing 170 and thence to escape through the leakage housing drain port 178.

To obviate the beforedescribed leakage problem, the hereinbefore described shaft sealing arrangement is preferably employed, in which the rate of leakage of liquid through the annular clearance space 89 and past the inboard seal rings 146, 148, and 150 is controlled by injection of liquid, which in connection with the herein described boiler feed example, would preferably be water. Such water is injected under pressure by suitable pressure pump means, not shown, by way of inlet pipe 122, as indicated by arrow 123 and through lateral duct 118 into the annular cavity 116, and thence through the apertures 168 in the intermediate annular spacer ring 152 into the intermediate space in the seal ring assembly surrounding the shaft seal sleeve 130 between the inboard set of seal rings 146, 148, and 150 and the outboard set of seal rings 154, 156, 158, 160, and 162. By regulation of the pressure of the liquid thus injected, the differential pressure across the set of inboard seal rings 146, 148, and 150 is controlled such that leakage occurs preferably at a very low rate, in an inboard direction past seal rings 146, 148, and 150, from the annular cavity 116 into the leakage collection chamber 94. The injected liquid leakage thus occurring from the annular cavity 116 into the leakage collection 94 commingles with the leakage liquid entering the leakage collection chamber 94 through the annular clearance space 89, and the thus commingled liquid is discharged, under the beforementioned controlled pressure, through the beforementioned passage 95 and discharge pipe 97. Under such controlled conditions, a small amount of leakage of injected liquid also occurs from the annular cavity 116 outwardly past the outboard set of seal rings 154, 156, 158, 160, and 162 into the leakage housing seal 174 from which it is drained through drain pipe 180.

A small portion of the leakage liquid escaping from the high pressure discharge bore section 18 of the pump housing 12 through the annular clearance base 89, is intercepted by the inlet duct 184 and flows therethrough into the top of the recess 182 and thence a part thereof escapes as indicated by arrows 101 through the relief clearance space 93 into the leakage collection chamber 94, and a part thereof flows across the interior of the recess 182 past and in contact with the inner end portion 204 of the temperature sensor assembly 198 and out therefrom through the outlet duct 186 into the leakage collection chamber 94.

By locating the inlet duct 184 at a predetermined position intermediate the inboard and outboard ends of the pressure reducing bushing 82, the pressure of the liquid reaching the duct 186 and recess 182, and thus the pressure to which the tubular element 200 of the temperature sensor assembly 198 is subjected, may be limited and controlled. For example, if the discharge pressure of the pump is 4,000 pounds p.s.i., and as beforementioned, if the pressure maintained in the leakage collection chamber 94 is approximately 100 pounds p.s.i., then if the inlet duct 184 is positioned approximately three-quarters of the way toward the outboard end of the pressure reducing bushing 82, the pressure in the recess 182 and that to which the recess 182 and the temperature sensor assembly 198 is subjected, will be reduced to approximately 1,000 pounds p.s.i. The inlet duct 184 may thus be located at substantially any position between the inboard and outboard ends of the pressure reducing bushing 82, but preferably at a position where the pressure will not be excessive and the temperature will be as close as possible to that of the fluid entering the inboard end of the pressure reducing bushing and not be influenced by the injection liquid entering the leakage collection chamber 94. The pressure in the recess 182 and that to which the temperature sensor element is subjected may also be controlled and also the quantity of liquid flowing past the end 204 of the temperature sensing element may be controlled, in part by the sizes of inlet duct 184, clearance space 93, and outlet duct 186.

In operation, a signal is produced or generated by the temperature-responsive element 205 which bears a predetermined functional relationship to the temperature of the leakage liquid reaching the recess 182, and such signal is conducted through conductors 206 and 208 in the temperature sensor assembly 198 to the lead-in terminals 210 and 212 and thence through the external conductors 214 and 216 to the control apparatus in control box 218. Similarly, the temperature-responsive element 222 produces or generates a signal which bears a predetermined functional relationship to the temperature of the liquid flowing through the inlet pipe 40 into the pump, and such signal is also conducted through the external conductors 226 and 228 to the control apparatus in the control box 218. The signals thus applied to the control apparatus in the control box 218 are combined by suitable electrical apparatus therein such as for example, an adjustable, sensitive differential relay device, to produce, under a controlled condition, as determined by adjustment of control knob 250, an output signal which is transmitted through conductors 238 and 240 to the electrically actuated valve operating means 236 of the outlet valve 232. For example, as hereinbeforementioned, under normal operating conditions, a differential temperature of from 20° F. to 75° F. may be expected between the liquid entering the pump through inlet pipe 40 and that being discharged from the pump through discharge pipe 44 and, under such conditions, the temperature differentials between the temperature responsive elements 222 and 205 would be substantially the same. By adjustment of the control means such as the beforementioned differential relay, in the control box 218 by suitable means such as control knob 250, no output signal will be transmitted through the conductors 238 and 240 to the valve operating means 236, except that which would tend to close or to hold valve 232 in a closed condition, so long as the signals in the conductors 214, 216, and 226, 228, correspond to those resulting from temperature differentials between the temperature responsive elements 205 and 222 which are not in excess of the beforementioned chosen range of 20° F. to 75° F. or such other limiting temperature differential as determined by adjustment of control knob 250. However, upon exceeding such predetermined temperature differential, the control mechanism in the control box 218 acts quickly to produce an output signal in conductors 238 and 240 such that the electrically actuated valve operating means 236 rapidly opens the valve 232, thereby permitting liquid to be discharged from the pump discharge to a suitable disposal area, thereby preventing cessation of flow of liquid through the pump or at least re-establishing such flow sufficiently quickly to prevent an excessive rise of temperature within the pump. Visual signal means may also be included in the control apparatus within the control box 18 as illustrated at 252 to indicate, either alone or simultaneously with the actuation of the valve 232, when an excessive temperature condition is being approached or has been reached within the pump.

The liquid discharged from the pump outlet 234 by the opening of the valve 232 as beforedescribed, is preferably not recycled to the inlet of the pump, for to do so would reduce the protective effectiveness of the system by returning already overheated liquid to the inlet of the pump which would result in rapid accumulation of heat within the pump.

When and if the temperature differential resulting in the beforedescribed opening of the valve 232 returns to normal the control apparatus within control box 218 acts to transmit a signal through conductors 226 and 228 such as to re-establish normal conditions by returning the valve 232 to its closed condition.

It is to be understood that the foregoing is illustrative only and that the invention is not limited thereby, but may include various modifications and changes made by those skilled in the art without distinguishing from the scope of the invention as defined in the appended claims.

What is claimed is:

1. In a pump having a housing, an impeller and stator assembly in said housing, the impeller thereof being fixed to a shaft extending from said housing, a fluid inlet through said housing to the inlet of said impeller and stator assembly, a fluid outlet through said housing from the discharge of said impeller and stator assembly which may be closed by closure means to reduce passage of fluid through said pump, and an opening in said housing leading from a location closely adjacent said discharge and which forms a pressure drop path for escape of a limited quantity of discharge fluid from said discharge to a region of reduced pressure, protective temperature rise detection means, comprising:
   fluid passage means communicating at one end with said pressure drop path, at a point between said discharge and said region of reduced pressure, for diverting at least a portion of said discharge fluid flowing through said path;
   and a first temperature responsive means, exposed to the fluid in said fluid passage means, for producing a first signal in response to and bearing a predetermined relation to the temperature of said portion of said discharge fluid.

2. Apparatus in accordance with claim 1 and second means for producing a second signal in response to and bearing a predetermined relation to the temperature of fluid entering said fluid inlet;
   and means responsive to said first and said second signal to produce a third signal bearing a predetermined functional relation to said first and second signals, whereby said third signal bears a predetermined relation to the temperature differential between said portion of said discharge fluid and said temperature of said fluid entering said fluid inlet.

3. Apparatus in accordance with claim 2 and means operative in response to said third signal for opening a normally closed flow path for fluid from the said discharge of said impeller and stator assembly, independent of such closure means, when said temperature differential is in excess of a predetermined value as aforesaid.

4. Apparatus in accordance with claim 3 including means to maintain said flow path in its normally closed condition when said temperature differential is below said predetermined value.

5. Apparatus in accordance with claim 1 in which said pressure drop path comprises an annular clearance space formed between a bore formed in a portion of said housing surrounding said shaft.

6. Apparatus in accordance with claim 5 in which said pressure drop path includes a cylindrical, axial force balancing member fixed to said shaft and positioned coaxially and rotatably slidable within said bore.

7. Apparatus in accordance with claim 6 including a stationary sleeve member fixed in said bore in said housing surrounding said shaft, said cylindrical, axial force balancing member fixed to said shaft being positioned coaxially and rotatably slidable within said sleeve member.

8. Apparatus according to claim 5 and separate fluid injection means for introducing fluid under pressure into said region of reduced pressure, whereby at least in part, the rate of said escape of fluid through said pressure drop path may be regulated.

9. Apparatus according to claim 7 and separate fluid injection means for introducing fluid under pressure into said region of reduced pressure, whereby at least in part, the rate of said escape of fluid through said pressure drop path may be regulated.

10. Apparatus in accordance with claim 9 and second means for producing a second signal in response to and bearing a predetermined relation to the temperature of fluid entering said fluid inlet;
   means responsive to said first and said second signal to produce a third signal bearing a predetermined functional relation to said first and second signals, whereby said third signal bears a predetermined functional relation to the temperature differential between said portion of said discharge fluid and said temperature of said fluid entering said fluid inlet;
   and means operative in response to such third signal for opening a normally closed escape path for fluid from the said discharge of said impeller and stator assembly when said third signal results from a said temperature differential in excess of a predetermined value, and for closing said escape path when said third signal results from a said temperature differential less than such predetermined value.

11. Apparatus in accordance with claim 1 in which said fluid passage means communicates at its other end with said region of reduced pressure, defining a bypass passage between said path and said region of reduced pressure.

12. Apparatus in accordance with claim 1 in which said fluid passage means includes a fluid receiving chamber; and said first temperature responsive means being disposed in said fluid receiving chamber.

13. Apparatus in accordance with claim 2 in which said fluid passage means includes a fluid receiving chamber; and said first temperature responsive means being disposed in said fluid receiving chamber.

14. Apparatus in accordance with claim 5 including seal means for sealing said shaft between said region of reduced pressure and the exterior of said housing; and separate fluid injection means for introducing fluid into said seal and at a pressure higher than that of said region of reduced pressure, whereby a portion of said injected fluid flows into said region of reduced pressure.

References Cited
UNITED STATES PATENTS

| | | | |
|---|---|---|---|
| 3,262,394 | 7/1966 | Smith et al. | 103—112 |
| 3,180,266 | 4/1965 | Smith | 103—41 |

HENRY F. RADUAZO, *Primary Examiner.*